Patented June 23, 1925.

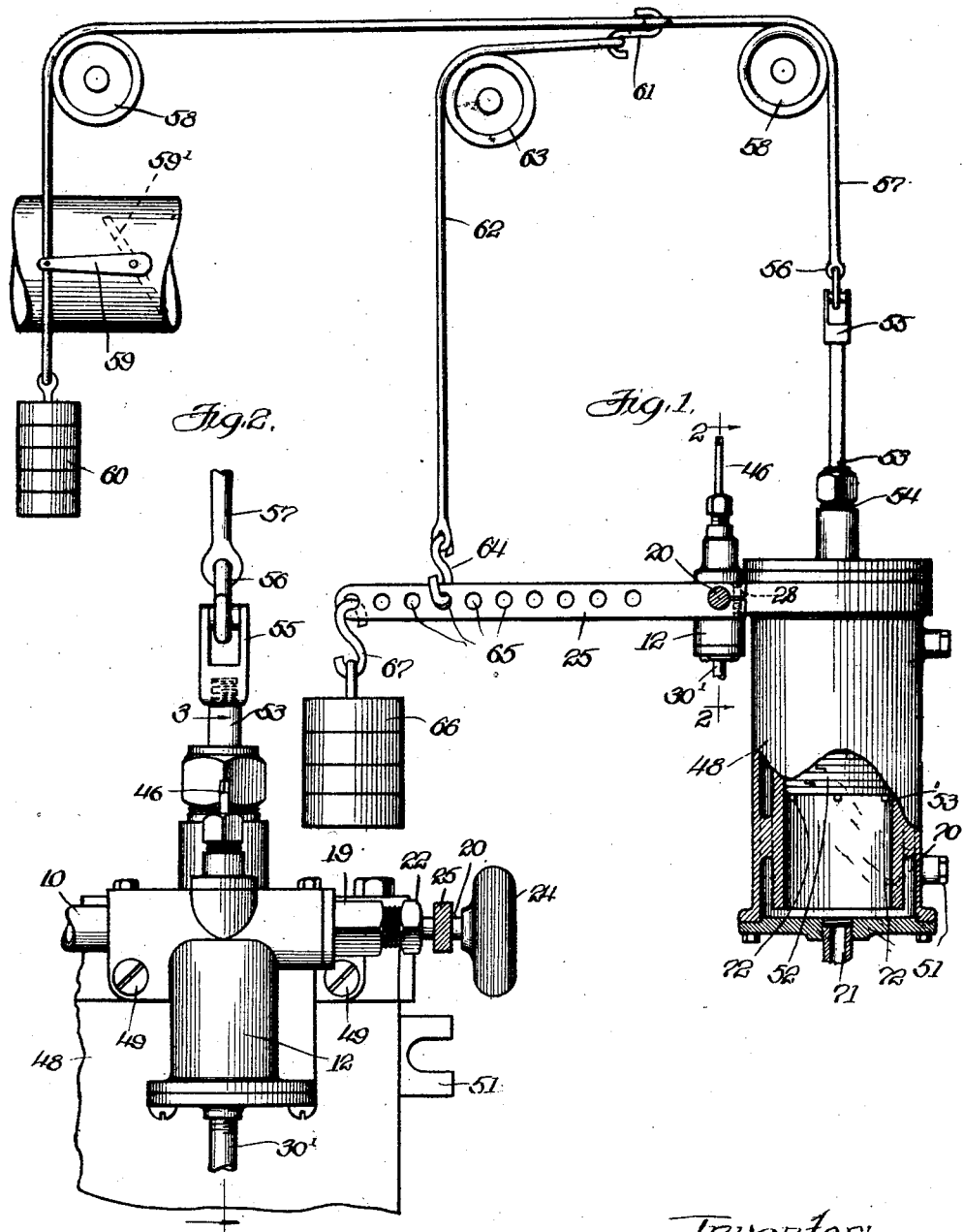

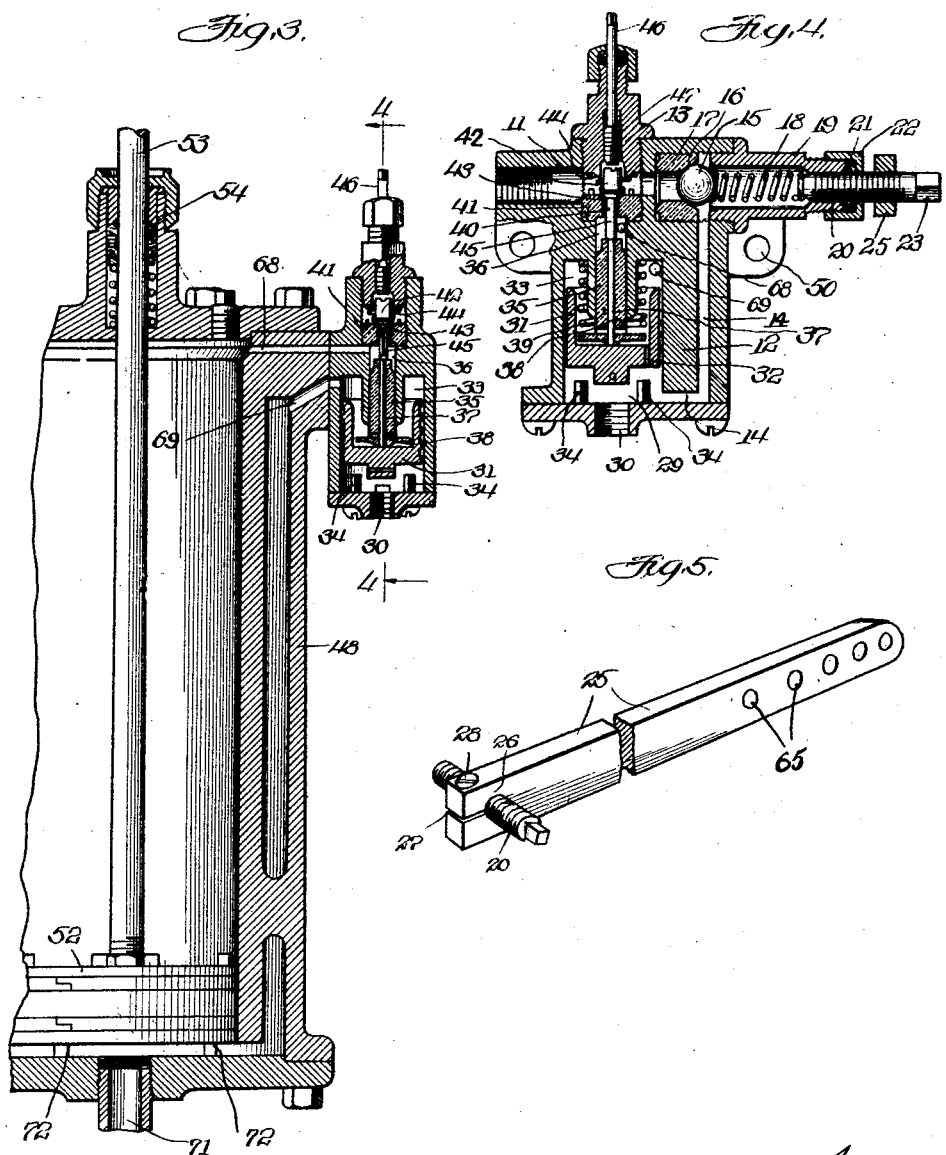

1,543,418

UNITED STATES PATENT OFFICE.

KENNETH J. BUDLONG, OF CHICAGO, ILLINOIS, ASSIGNOR TO NATIONAL REGULATOR COMPANY, OF CHICAGO, ILLINOIS, A CORPORATION OF ILLINOIS.

REGULATOR FOR HIGH-PRESSURE SYSTEMS.

Application filed September 12, 1921. Serial No. 500,195.

*To all whom it may concern:*

Be it known that I, KENNETH J. BUDLONG, a citizen of the United States, residing at Chicago, in the county of Cook and State of Illinois, have invented new and useful Improvements in Regulators for High-Pressure Systems, of which the following is a full, clear, concise, and exact description, reference being had to the accompanying drawing, forming a part of this specification.

My invention relates to improvements in pressure regulators for high pressure systems, and has for its object the production of a device of this character which will be automatically and gradually adjustable so as to adapt the same for regulation over a wide range of pressure variation, as wide for instance, as fifteen pounds, the same in this respect being an improvement of the regulator shown in United States patent to John M. Larson, No. 1,376,948, dated May 3, 1921.

A further object is the production of a regulator, as mentioned, which will be of durable and economical construction and highly efficient in use.

Other objects will appear hereinafter.

With these objects in view the invention consists in the combinations and arrangements of parts hereinafter described and claimed.

The invention will be best understood by reference to the accompanying drawing in which like characters of reference in the various views refer to corresponding parts.

In the drawings—

Fig. 1 is a side elevation, partly in section, of a device embodying the invention, the same being shown operatively connected with a damper of a high pressure system or plant;

Fig. 2 is an enlarged section taken on line 2—2 of Fig. 1;

Fig. 3 is a central vertical section taken on substantially line 3—3 of Fig. 2;

Fig. 4 is a slightly enlarged section taken on substantially line 4—4 of Fig. 3; and Fig. 5 is a perspective view of an actuating arm employed in the regulator.

The preferred form of construction, as illustrated in the drawings, is designed for use in connection with a high pressure system or plant, the regulation in the system or plant being accomplished through automatic adjustment of the damper which controls the draught of the fire box or heating element of the system or plant.

In the drawings, 10 represents a pipe from a source of steam pressure, such, for instance, as the boiler of the system or plant in connection with which the device is used. The pipe 10 communicates with a chamber 11 in the main valve casting 12, said main valve being of much the same construction as that shown in said U. S. Patent No. 1,376,948 above referred to. The chamber 11 extends below a plug 13 threaded in the upper side of the casting 12 and communicates with the upper end of a passage 14 also formed in said casting. Communication between chamber 11 and passage 14 is controlled by a ball check valve 15 which is adapted to seat on a valve seat 16 formed in an annular member 17 threaded in the casting 12.

Cooperating with the valve 15 is a helical compression spring 18 arranged in a housing 19 threaded into one side of casting 12. Threaded into the outer end of housing 19 is a stem 20, suitable packing 21 being provided which is held in position by a screw cap 22 to prevent leakage around said stem. The inner end of stem 20 engages against the adjacent end of spring 18, the arrangement being such, as will be seen, that the pressure exerted by said spring upon the valve 15 may be varied by rotatable adjustment of said stem. Said stem is provided with a squared outer end 23 on which a hand wheel 24 is provided whereby said stem may be manually adjusted if desired. Automatic adjustment of said stem is effected through the medium of an elongated arm 25, one end of which is formed to constitute a clamp adapted to engage with the protruding end of said stem. To this end said arm is provided with an opening 26 which is screw threaded for engagement with the threads of said stem, and is slit or bifurcated as at 27, the divided portions being connected by a screw 28 whereby the same may be drawn together in order to clampingly engage with the stem, as will be readily understood.

The clamping engagement of the arm 25 with the stem 20 is such that in the rocking or rotary movement of said arm said stem will be correspondingly moved. At the same time, the arrangement is such, that said stem may be manually adjusted through engagement with the hand wheel 24 independently of said arm inasmuch as the frictional engagement of said arm with said stem is such that the same may be readily overcome by manual force applied to the hand wheel.

The passage 14 communicates with a chamber 29 provided in the main valve casting 12. A threaded opening 30 leads from the underside of said chamber for connection with a pipe 30' adapted to connect with a pressure gauge. Above the chamber 29 is a vertically movable plunger 31, said plunger being provided with a small passage or bleed 32 which establishes communication between the chamber 29 and a chamber 33 formed above said plunger. Lugs 34 arranged in the chamber 29 are provided to limit downward movement of plunger 31.

Slidably mounted in casting 12 axially above the plunger 31 is a plunger 35 above the upper end of which is formed a chamber 36. Communication between chambers 33 and 36 may be established through an axial passage 37 formed in the plunger 35 and branch passages 38 leading from the lower end of said axial passage, as clearly seen in Fig. 4.

The plunger 35 is normally held at its lower terminal of movement, that is, in a position in which the same engages against the upper side of plunger 31, by means of a helical compression spring 39, the lower end of said plunger being enlarged for engagement with said spring.

Communication between the chambers 11 and 36 may be established through a passage 40 formed in an annular member 41 threaded into casting 12. Said passage 40 is controlled by a check valve 42 which is normally held in closed position, that is, engaging against its valve seat 43 by means of a compression spring 44. Said valve 42 is provided with a depending stem 45 which passes through the passage 40 for engagement with the upper end of plunger 35. The arrangement is such that valve 42 will be open only upon upward movement of plunger 35 into engagement with stem 45, and when said stem 45 is in engagement with said plunger, the lower end of said stem will close the upper end of passage 37 and thus cut off communication between chambers 33 and 36.

Upward movement of valve 42 is limited by a stem 46, the lower end portion 47 of which is threaded into plug 13, as clearly seen in Fig. 4. The exteriorly projecting end of said stem is suitably packed to prevent leakage around the same.

The main valve casting 12 is mounted upon one side of a cylinder 48, the same being secured thereto by screws 49, said casting being provided with suitable openings 50 to accommodate said screws. The rear side of cylinder 48 is provided with slotted lugs 51 for mounting of the same upon a suitable support.

Operating in the cylinder 48 is a piston 52 carried by a piston rod 53 which projects exteriorly through the upper end or head of said cylinder, a suitable packing 54 surrounding said stem to prevent leakage. The upper end of said rod is provided with an eye 55 for engagement by a connecting element 56 provided at one end of a cable, chain or other suitable flexible connector 57. The member 57 passes around suitable pulleys 58 for connection with the actuating arm 59 of the damper 59' to be controlled a counter weight 60 cooperates with the actuating arm 50 to rock the same downwardly. The arrangement is such, as will be seen, that said damper actuating arm will be rocked in the opposite direction through downward movement of piston 52 in cylinder 48.

Connected by means of a connecting member 61 with the flexible member 57 is a similar flexible connecting member 62, the same passing around a suitably positioned pulley 63 and being connected at its lower end through the medium of a hook member 64 with the arm 25, said arm being provided with a plurality of spaced openings 65 for engagement by the member 64. With this arrangement it will be seen that when the piston 52 moves downwardly in the cylinder 48, the arm 25 will be rocked upwardly causing the screw 20 to be positively rotated with the result that the tension of spring 18 will be increased and hence the pressure exerted thereby on the valve 15 increased. Cooperating with the arm 25 is also a counter weight 66 connected with said arm by means of a member 67. The members 61, 64 and 67 are, as seen, preferably in the form of S-hooks. In the upward movement of the piston 52, the counter weight 66 will cause downward rocking of the arm 25 with the result that the screw 20 will be reversely rotated and hence the tension of the spring 18 decreased.

The chamber 36 of the main valve housing 12 is connected by a passage 68 with the cylinder 48 above the piston 52. The chamber 33 of said main valve housing is connected by a passage 69 with a passage or space 70 formed in the walls of cylinder 48, the lower end of said passage or space 70 communicating with an exhaust pipe 71. Lugs 72 are provided at the lower end of piston 52 to limit downward movement thereof.

In the operation of the device, the steam under pressure from the boiler in connection with which the device is used will enter the chamber 11 from the pipe 10. When said steam under pressure exceeds the pressure of the spring 18 on the valve 15, the steam will flow past said valve into passage 14 and thence into chamber 29 below plunger 31. When the pressure below said plunger 31 exceeds that of the spring 39, said plunger will be moved upwardly which, in turn, will cause the plunger 35 to be moved upwardly. The upper end of plunger 35 will contact with the stem 45 of valve 42 and cause the latter to be lifted from its seat. The steam under pressure in chamber 11 will then flow past the valve 42 and through the passage 40 into the chamber 36. The upper end of passage 37 being closed by the lower end of stem 45, the steam under pressure in said chamber 36 will then flow through the passage 68 into the upper end of cylinder 48 causing the latter to be moved downwardly. Downward movement of said piston will have the effect of tilting the damper toward closing position in order to quench the fire and hence to decrease the pressure in the boiler. At the same time said downward movement of piston 52 will have the effect of rocking the arm 25 upwardly thus automatically increasing the tension of the spring 18 and hence the pressure exerted thereby on the valve 15. The pressure of spring 18 upon the valve 15 will be automatically and gradually increased as the piston 52 moves downwardly under increasing pressure in the boiler, with the result that a very sensitive regulation is secured and yet one which will automatically vary to accommodate a wide range of pressure variation in the boiler.

As the pressure in the boiler decreases by reason of closing of the damper, as just described, the pressure in the chamber 11 will in time fall below the pressure exerted by the spring 18 and upon valve 15, when said valve will be moved to closing position under the influence of said spring. When this takes place, communication between the chamber 11 and passage 14 will be shut off. Any steam or fluid in passage 14 and chamber 29 will gradually pass through the restricted opening or bleed 32 in plunger 31 and enter chamber 33. In this event the pressure of spring 39 aided by the pressure of the steam in chamber 36 will cause plunger 35 and hence the plunger 31 to move downwardly. When this takes place, the valve 42 will first be permitted to move to closing position under the influence of spring 44 and when plunger 35 has moved downwardly to a sufficient extent, the upper end of the same will move away from the lower end of stem 45 thus uncovering the upper end of passage 37 in said plunger. When this takes place, it will be seen that the steam under pressure in the upper end of cylinder 48 will be permitted to flow through the passage 68 into chamber 36, whence the same will flow through the passage 37 and branch passages 38 into chamber 33 and thence through passages 69 and 70 into exhaust pipe 71. The pressure above piston 52 is thus released allowing the latter to move upwardly under the influence of counter weight 60. As said counter weight moves downwardly, the damper will be moved to open position as will be readily understood. In this movement of the piston, the arm 25, under the influence of counter weight 66 is moved downwardly thus retracting screw 20 with the result that the tension of spring 18 and hence the pressure exerted thereby on valve 15 will be decreased.

Automatic control of the pressure of the plant or system in connection with which the device is used as thus secured and in such a manner that control of the pressure will be extended over a considerable range. The extent of this range may be varied so that the device will be effective within limits up to say fifteen pounds variation in the boiler through adjustment of the connecting member 64 along the arm 25. The closer said member 64 is placed with respect to the fulcrum of said arm, the smaller will be the movement of the latter and hence the variation in the tension of the spring 18 with respect to the movement of piston 52; and the farther from the fulcrum of said arm said member 64 is moved, the greater the movement of said arm and hence the greater the variation in the tension of spring 18 will be with respect to the movement of said piston 52. To permit of this shifting of the member 64 along the arm 25, a plurality of spaced openings 65 is employed in said arm, as before described.

It has been found in practice that this form of regulator is especially applicable in connection with high pressure plants using stokers and forced or induced draught fans where the boiler pressure is suddenly reduced or increased and to a considerable extent.

While I have illustrated and described the preferred form of construction for carrying my invention into effect, this is capable of variation and modification without departing from the spirit of the invention. I therefore do not wish to be limited to the precise details of construction set forth but desire to avail myself of such variations and modifications as come within the scope of the appended claims.

Having thus described my invention, what I claim as new and desire to secure by Letters Patent is:

1. In a regulator, the combination with a cylinder; a piston operating therein; and a source of fluid pressure, of means for utilizing said pressure to regulate the movement of said piston, said means comprising a check valve adjustable to open at a predetermined fluid pressure; rotatable means for varying the adjustment of said valve; and means for utilizing the movement of said piston to rotate said rotatable means.

2. In a regulator, the combination of a cylinder; a piston operating therein; and a source of fluid pressure, of means for utilizing said pressure to regulate the movement of said piston, said means comprising a check valve mechanism adjustable to open at a predetermined fluid pressure; said valve mechanism comprising a spring exerting a pressure on the valve and tending to close the valve; screw threaded means against which said spring engages; and means for utilizing the movement of said piston to adjust said screw threaded means for varying the pressure exerted by said spring on the valve.

3. In a regulator, the combination of a cylinder; a piston operating therein; and a source of fluid pressure, of means for utilizing said pressure to regulate the movement of said piston, said means comprising a spring check valve adjustable to open at a predetermined fluid pressure; a screw threaded stem for adjusting said valve; and means for utilizing the movement of said piston to adjust said stem for varying adjustment of said valve.

4. In a regulator, the combination with a cylinder; a piston operating therein; and a source of fluid pressure, of means for utilizing said pressure to regulate the movement of said piston, said means comprising a valve; a spring exerting pressure on said valve; a screw threaded stem cooperating with said spring for varying the pressure exerted thereby on said valve; a clamp on said stem for rotating the same; and means operable through movement of said piston for actuating said clamp.

5. In a regulator, the combination with a cylinder; a piston operating therein; and a source of fluid pressure, of means for utilizing said pressure to regulate the movement of said piston, said means comprising a valve; a spring exerting pressure on said valve; a screw threaded stem cooperating with said spring for varying the pressure exerted thereby on said valve; a clamp on said stem for rotating the same; an arm on said clamp; and means operatively connecting said arm and said piston whereby said arm will be rocked upon movement of said piston.

6. In a regulator, the combination with a cylinder; a piston operating therein; and a source of fluid pressure, of means for utilizing said pressure to regulate the movement of said piston, said means comprising a valve; a spring exerting pressure on said valve; a screw threaded stem cooperating with said spring for varying the pressure exerted thereby on said valve; a clamp on said stem for rotating the same; an arm on said clamp; means operatively connecting said arm and said piston whereby said arm will be rocked upon movement of said piston; and means for varying the amplitude of movement of said arm with respect to the movement of said piston.

7. In a regulator, the combination with a cylinder; a piston operating therein; and a source of fluid pressure, of means for utilizing said pressure to regulate the movement of said piston, said means comprising a valve; a spring exerting pressure on said valve; rotatable means for varying the pressure exerted by said spring on said valve; means for utilizing the movement of said piston to rotate said rotatable means; and means for varying the amplitude of rotation of said rotatable means with respect to the movement of said piston.

8. In a regulator, the combination with a cylinder; a piston operating therein; and a source of fluid pressure, of means for utilizing said pressure to regulate the movement of said piston, said means comprising a valve; a spring exerting pressure on said valve; a screw threaded stem cooperating with said spring for varying the pressure exerted thereby on said valve; a clamp on said stem for rotating the same; an arm on said clamp; means operatively connecting said arm and said piston whereby said arm will be rocked upon movement of said piston; and means for shifting the point of connection of said last mentioned means with said arm in order to vary the amplitude of movement of said arm with respect to the movement of said piston.

9. In a regulator, the combination with a cylinder; a piston operating therein; and a source of fluid pressure, of means for utilizing said pressure to regulate the movement of said piston, said means comprising a valve; a spring exerting pressure on said valve; a screw threaded stem cooperating with said spring for varying the pressure exerted thereby on said valve; a clamp on said stem for rotating the same; an arm on said clamp; and means operatively connecting said arm and said piston whereby said arm will be rocked upon movement of said piston, said arm having spaced opening for engagement by said last mentioned means whereby the amplitude of movement of said arm may be varied with respect to the movement of said piston.

10. In a regulator, the combination with a cylinder; a piston operating therein; and a source of fluid pressure, of means for utilizing said pressure to regulate the movement of said piston, said means comprising a valve; a spring exerting pressure on said valve; a screw threaded stem cooperating with said spring for varying the pressure exerted thereby on said valve; a clamp on said stem for rotating the same, said clamp having threads sufficiently firmly engaging the threads of said stem whereby said stem may rotate with said clamp when the latter is moved, but said stem will be free to be rotated in said clamp; and means operable through movement of said piston for actuating said clamp.

11. In a varying pressure fluid system, actuating means effective to control the pressure upon the occurrence of a predetermined pressure during a period of rising pressure, and mechanism operated by said means, which mechanism during the succeeding period of falling pressure serves to render said means ineffective at a pressure higher than said predetermined pressure by an amount dependent upon the extent of said period of rising pressure.

12. In a pressure regulating system, a check-valve subjected to the pressure, said valve being adjustable to open upon the occurrence of pressures above a predetermined value, pressure controlling means effective upon the opening of said valve, and mechanism operatively connecting said means to said valve whereby said valve is temporarily and gradually adjusted throughout the periods of movement of said pressure controlling means to close again at a pressure higher than said predetermined value.

13. In a regulator, the combination with a cylinder; a piston operating therein; and a source of fluid pressure, of means for utilizing said pressure to regulate the movement of said piston, said means comprising a check-valve adjustable to open at a predetermined fluid pressure, and means for utilizing the movement of said piston to adjust said valve to close upon the occurrence of pressure values dependent upon the extent of the movement of said piston.

14. In a regulator, the combination with a cylinder; a piston operating therein; and a source of fluid pressure; of means for utilizing said pressure to regulate the movement of said piston, said means comprising a valve, means exerting a pressure on said valve opposed to the fluid pressure exerted thereon; and means for gradually increasing such pressure exerted on said valve when the fluid pressure at said source increases and for gradually decreasing such pressure exerted on said valve when the fluid pressure at said source decreases.

15. In a regulator, the combination with a cylinder; a piston operating therein; and a source of fluid pressure; of means for utilizing said pressure to regulate the movement of said piston, said means comprising a check-valve adjustable to open at pressures above a predetermined value; and means for gradually adjusting said valve during the entire movement of the piston to close at higher pressures when the fluid pressure at said source gradually increases.

16. In a varying pressure fluid system, means effective for providing a graduated control of the pressure upon the occurrence of a predetermined actuating pressure during periods of rising pressure, and mechanism operated by said means, which mechanism effects graduated temporary adjustments of said means, the extent of such adjustments bearing a predetermined relation to the extent of said graduated control whereby during the succeeding periods of falling pressure said means may be automatically rendered ineffective at pressures higher than said predetermined pressure.

17. In a steam boiler regulator, steam actuated damper operating means, mechanism including a check-valve utilizing the steam pressure to regulate said damper operating means, and means utilizing the movement of said damper operating means to gradually alter the adjustment of said check-valve to actuate at pressures dependent upon the travel of said damper operating means.

In witness whereof, I have hereunto subscribed my name.

KENNETH J. BUDLONG.

Witness:
JOHN M. LARSON.